G. A. ANDEREGG.
MANUFACTURE OF ELECTRIC CABLES.
APPLICATION FILED MAY 2, 1914.
1,124,249.
Patented Jan. 12, 1915.
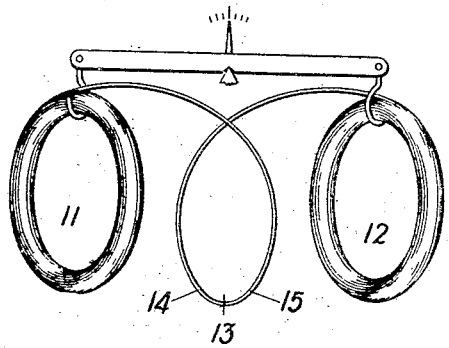
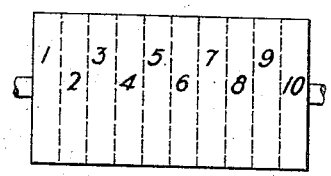
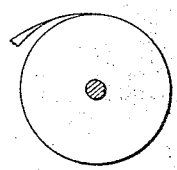
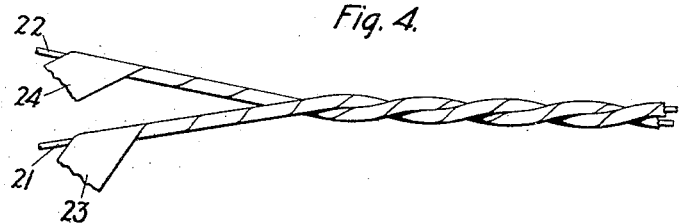
Witnesses:
Ray C. Hopgood
O.D.M. Luther
Inventor:
Gustavus A. Anderegg
by J. C. Kennet,
Att'y

UNITED STATES PATENT OFFICE.

GUSTAVUS A. ANDEREGG, OF OAK PARK, ILLINOIS, ASSIGNOR TO WESTERN ELECTRIC COMPANY, OF NEW YORK, N. Y., A CORPORATION OF ILLINOIS.

MANUFACTURE OF ELECTRIC CABLES.

1,124,249.　　　　Specification of Letters Patent.　　Patented Jan. 12, 1915.

Application filed May 2, 1914.　Serial No. 836,037.

*To all whom it may concern:*

Be it known that I, GUSTAVUS ANDEREGG, a citizen of the United States, residing at Oak Park, in the county of Cook and State of Illinois, have invented a certain new and useful Improvement in Manufacture of Electric Cables, of which the following is a full, clear, concise, and exact description.

This invention relates to the manufacture of electric cables, and more particularly to the manufacture of pairs of insulated conductors for use in electric cables.

The object of this invention is the production of an efficient electric cable of improved and uniform electric characteristics.

Very generally, the electrical characteristics of the completed electric cable heretofore manufactured have varied between very wide limits, and upon investigation it has been determined that these irregularities are largely due to the irregularities present in the commercial wire and the insulation therefor. Investigation has shown that the degree of hardness of commercial wire varies from coil to coil and from point to point in the same coil, yet this last mentioned variation is generally slight as compared to the variation from coil to coil. It is possible to refine the processes of wire manufacture to such an extent that the variation in degree of hardness of the wire from coil to coil is negligible, but when such refinements are resorted to, the cost thereof is proportionately large compared to the value of the improvements resulting therefrom in the electric cables in which such wire is used. In fact, this cost is so high as to practically prohibit the use of such wire in electric cables, hence the desirability of securing these improvements in some other manner less costly.

To a great extent, paper is used as the insulating medium for the conductors of electric cables, especially electric cables for telephone and telegraph purposes. In the manufacture of this paper, the paper is made in wide sheets, *e. g.* thirty inches or more, and in long lengths, and is wound into a roll. For use in insulating the conductors, the paper is cut into the proper width for the particular size of conductor to be insulated, and wound into rolls which are generally known as "disks" or "pads." Investigation has shown that the density and thickness of the paper in the various pads from the same roll, as well as from different rolls, vary between very wide limits. More uniform paper, both as to density and thickness, can be manufactured, but as is the case with wire, the cost of these refinements is such as to practically prohibit the use of the improved paper in the manufacture of electric cables. Hence, the desirability of the discovery and the adoption of a method whereby improvements may be obtained in electric cables.

In the manufacture of the pairs of insulated conductors for electric cables, it has been the practice to select any two wires of the proper size, insulate each with the paper of the proper size and then twist together these insulated conductors to form a pair. From what appears above as to the irregularities in the wire and insulation, it will readily be apparent that in the finished twisted pair of conductors, the degree of hardness of the two conductors and the density and thickness of the insulation thereon at any point of the pair may or may not differ, there being a greater probability of difference rather than similarity, which is abundantly supported by many tests.

It has been determined that if the degree of hardness of the two conductors and the density of the insulating coverings therefor, as well as the thickness of the coverings from point to point throughout the length of the pair of insulated conductors, are equal or nearer equal, improved and more uniform electrical characteristics will result in the completed electric cable.

Using the commercial materials above referred to and using a process embodying this invention, there results an electric cable having improved and more uniform electrical characteristics.

This invention will be fully understood by reference to the following description and to the drawings wherein—

Figure 1 shows a coil of wire being separated into two equal parts by means of a balance; Fig. 2 shows a series of pads of insulating paper mounted upon a dowel; Fig. 3 is an end view of the dowel of pads shown in Fig. 2; and Fig. 4 illustrates a pair of insulated conductors.

In accordance with this invention, a coil of wire, as shown in Fig. 1, may be divided by weight into two equal coils 11 and 12, the original coil being cut at 13. An end of coil 11 is tagged as at 15, and an end of coil 12 is tagged as at 14. The wire of coil 11 forms one conductor of a pair, and the wire of coil 12 forms the other conductor of the same pair. After the operation of slitting the paper to form pads, and the mounting of the pads on a dowel (shown in Fig. 2), in the same sequence as that of their position in the roll before slitting, the pads are numbered consecutively as 1, 2, 3, 4, 5, etc. The odd numbered pads, or as many as are required, are used in insulating the wire from one coil, e. g. 11, and the even numbered pads, or as many as are required, are used in insulating the wire from the other coil 12.

The insulating of the wire from coil 11 is commenced by applying paper tape from pad 1 to the tagged end 15, and the coil 12 by applying paper tape from pad 2 to the tagged end 14. Should the paper tape run out before the ends of the coils 11 and 12 are reached, pad 1 is replaced by pad 3, and pad 2 by pad 4. Then, if these replacing pads are insufficient, they are respectively replaced by pads 5 and 6. This is repeated in like manner until the wire from each coil is covered. After the coils of wire 11 and 12 are insulated with paper tape from odd and even numbered pads respectively, the two insulated conductors are twisted together to form the pair shown in Fig. 4. In this figure, 21 may represent a conductor originally taken from the coil 11 and insulated with paper tape 23 from odd numbered pads, while 22 may represent a conductor originally taken from the coil 12 and insulated with paper tape 24 from even numbered pads. It will be seen, therefore, that since the two conductors of a pair are from the same original coil of wire, there will be greater similarity in degree of hardness of the two conductors. Furthermore, since paper tape from odd numbered pads is used on one conductor and paper tape from even numbered on the other, at any point throughout the length of the pair, the density and thickness of the paper tape on the two conductors will be more uniform, for the paper tape is from adjacent pads.

What is claimed is:

1. The process of forming a twisted pair of insulated conductors which consists in slitting a roll of insulation into pads, selecting two pads from neighboring positions in said roll, covering one conductor with insulation from one of said neighboring pads, covering another conductor with insulation from the other of said neighboring pads, and twisting together said insulated conductors.

2. The process of forming a twisted pair of insulated conductors which consists in slitting a roll of insulation into pads, selecting two pads from adjacent positions in said roll, covering one conductor with insulation from one of said adjacent pads, covering another conductor with insulation from the other of said adjacent pads, and twisting together said insulated conductors.

3. The process of forming a twisted pair of insulated conductors which consists in slitting a roll of paper into pads of paper tape, selecting two pads from adjacent positions in said roll, insulating a conductor with paper tape from one of said adjacent pads, insulating another conductor with paper tape from the other of said adjacent pads, and twisting together said insulated conductors.

4. The process of forming a twisted pair of insulated conductors which consists in dividing a coil of wire into two equal parts to form the conductors of the pair, slitting a roll of insulation into pads, selecting two pads from neighboring positions in said roll, covering one of said conductors with insulation from one of said neighboring pads, covering another of said conductors with insulation from the other of said neighboring pads, and twisting together said insulated conductors.

5. The process of forming a twisted pair of insulated conductors which consists in dividing a coil of wire into two equal parts to form the conductors of the pair, slitting a roll of insulation into pads, selecting two pads from adjacent positions in said roll, covering one of said conductors with insulation from one of said adjacent pads, covering another of said conductors with insulation from the other of said adjacent pads, and twisting together said insulated conductors.

6. The process of forming a twisted pair of insulated conductors which consists in dividing a coil of wire into two equal parts to form the conductors of the pair, slitting a roll of paper into pads of paper tape, selecting two pads from adjacent positions in said roll, insulating one of said conductors with paper tape from one of said adjacent pads, insulating another of said conductors with paper tape from the other of said adjacent pads, and twisting together said insulated conductors.

In witness whereof, I hereunto subscribe my name this 27th day of April A. D., 1914.

GUSTAVUS A. ANDEREGG.

Witnesses:
FREDERIC W. WILLARD,
C. W. ROBBINS.